United States Patent [19]

Nukada et al.

[11] Patent Number: 5,495,011
[45] Date of Patent: Feb. 27, 1996

[54] PROCESS FOR PREPARING HYDROXYGALLIUM PHTHALOCYANINE CRYSTAL, PRODUCT THEREOF AND ELECTROPHOTOGRAPHIC PHOTORECEPTOR USING THE SAME

[75] Inventors: Katsumi Nukada; Katsumi Daimon; Masakazu Iijima; Yasuo Sakaguchi, all of Minami-ashigara, all of Japan

[73] Assignee: Fuji Xerox Co., Ltd., Tokyo, Japan

[21] Appl. No.: 108,532

[22] Filed: Aug. 19, 1993

[30] Foreign Application Priority Data

Aug. 25, 1992 [JP] Japan .................... 4-247162

[51] Int. Cl.⁶ ................ C09B 47/067; C09B 47/06
[52] U.S. Cl. ............ 540/142; 540/139; 540/140
[58] Field of Search .................... 540/139, 140, 540/142, 143

[56] References Cited

U.S. PATENT DOCUMENTS

| | | | |
|---|---|---|---|
| 2,770,629 | 11/1956 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 96/1.5 |
| 4,777,251 | 10/1988 | Tanaka et al. | 540/143 |
| 5,164,493 | 11/1992 | Mayo et al. | 540/143 |
| 5,182,382 | 1/1993 | Mayo et al. | 540/143 |
| 5,183,886 | 2/1993 | Takagishi | 540/143 |
| 5,189,156 | 2/1993 | Mayo et al. | 540/143 |
| 5,270,463 | 12/1993 | Itoh et al. | 540/143 |

FOREIGN PATENT DOCUMENTS

| | | |
|---|---|---|
| 50-38543 | 4/1975 | Japan . |
| 1-221459 | 9/1989 | Japan . |
| 3-30854 | 5/1991 | Japan . |

OTHER PUBLICATIONS

John P. Linsky, et al., "Studies of a Series of Haloaluminum, –gallium, and –indium Phthalocyanines", *Inorg. Chem.*, 1980, 19, pp. 3131–3135.

D. Colaitis, "Etude de Quelques Derives de la Phtalocyanine Discussion des Divers Modes D'Obtention," *Bull. Soc. Chim.*, France, 1962, pp. 23–26.

*Primary Examiner*—Nicholas Rizzo
*Assistant Examiner*—Pavanaram K. Sripada
*Attorney, Agent, or Firm*—Oliff & Berridge

[57] ABSTRACT

A process for preparing hydroxygallium phthalocyanine comprising reacting a gallium trialkoxide and phthalonitrile or diiminoisoindoline in an alcohol solvent, preferably an alcohol having a boiling point of not lower than 150° C., such as ethylene glycol, and hydrolyzing the resulting gallium phthalocyanine, preferably in an aqueous solution of an acid, such as sulfuric acid. The resulting hydroxygallium phthalocyanine exhibits stable electrophotographic characteristics, particularly photosensitivity, charging properties, and a dark decay rate.

22 Claims, 5 Drawing Sheets

BRAGG ANGLE (2θ)

BRAGG ANGLE (2θ)

PROCESS FOR PREPARING HYDROXYGALLIUM PHTHALOCYANINE CRYSTAL, PRODUCT THEREOF AND ELECTROPHOTOGRAPHIC PHOTORECEPTOR USING THE SAME

FILED OF THE INVENTION

This invention relates to a novel process for preparing hydroxygallium phthalocyanine, a product thereof and an electrophotographic photoreceptor using the same.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

It is known that phthalocyanine compounds generally exhibit many different crystal forms depending on the process of synthesis or the process of treatment and that the difference in crystal form has a great influence on their photoelectric conversion characteristics. For example, known crystal forms of copper phthalocyanine compounds include α-, π-, χ-, ρ-, γ-, and δ-forms as well as a stable β-form. These crystal forms are known capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 (the term "JP-A" as used herein means an "unexamined published Japanese patent application") refers to the relationship between a crystal form of copper phthalocyanine and its electrophotographic characteristics. Besides copper phthalocyanine, it has been proposed to use various crystal forms of metal-free phthalocyanine, hydroxygallium phthalocyanine, chloroaluminum phthalocyanine, chloroindium phthalocyanine, etc. in electrophotographic photoreceptors.

A process for synthesizing hydroxygallium phthalocyanine comprising hydrolysis of chlorogallium phthalocyanine is described in *Bull. Soc. Chim.*, No. 1962, pp. 23–26, France (1962) and JP-A-1-221459.

The hydroxygallium phthalocyanine prepared by the process, even with the crystal form being equal, show large variation in performance as a charge generating material of an electrophotographic photoreceptor, particularly sensitivity, charging properties, and a dark decay rate, and it has been difficult to obtain hydroxygallium phthalocyanine with stable characteristics.

SUMMARY OF THE INVENTION

An object of the present invention is to provide a novel process for preparing hydroxygallium phthalocyanine having stable electrophotographic characteristics.

As a result of extensive investigations, the present inventors have found that hydroxygallium phthalocyanine synthesized from a gallium trialkoxide as one of reactants and hydrolyzing the resulting reaction product exhibits highly stable electrophotographic characteristics, and thus reached the present invention.

The present invention relates to a process for preparing hydroxygallium phthalocyanine comprising reacting a gallium trialkoxide and phthalonitrile or diiminoisoindoline in an alcohol solvent and hydrolyzing the resulting gallium phthalocyanine.

DETAILED DESCRIPTION OF THE INVENTION

Figure 1:
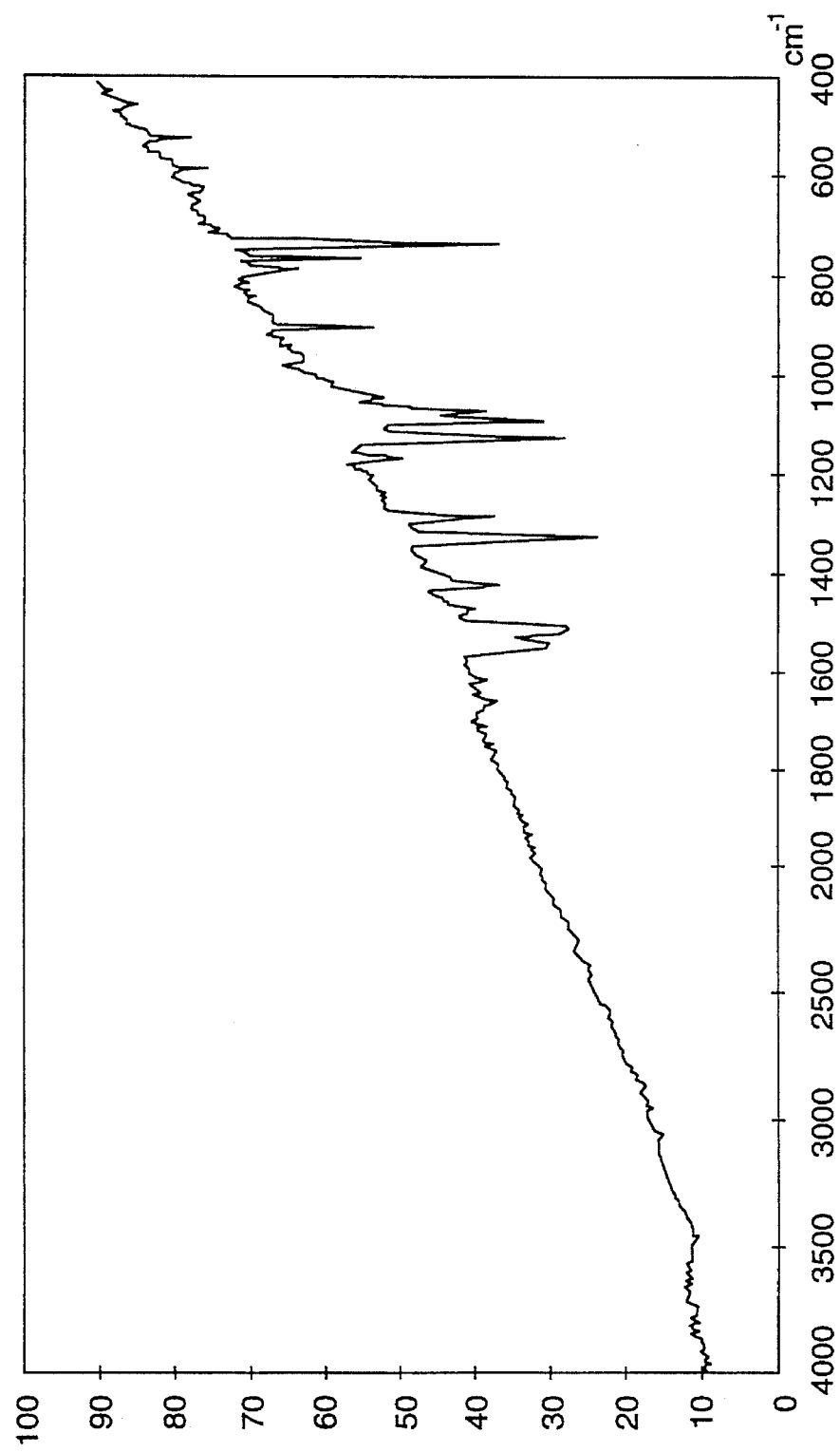
FIG. 1 is an IR spectrum of the hydroxygallium phthalocyanine obtained in Example 1.

According to the present invention, hydroxygallium phthalocyanine with excellent electrophotographic characteristics can be prepared by a relatively simple process comprising reacting a gallium trialkoxide represented by formula $(RO)_3Ga$, wherein three Rs may be the same or different and each R represents an alkyl group, with phthalonitrile or diiminoisoidoline in an alcohol solvent and hydrolyzing the reaction product.

The alkyl group as represented by R in the above formula includes straight chain or branched alkyl groups having from 1 to 20 carbon atoms, e.g., methyl, ethyl, n-propyl, isopropyl, n-butyl, isobutyl, sec-butyl, t-butyl, n-pentyl, isopentyl, t-pentyl, n-hexyl, n-octyl, isooctyl, dodecyl, and cetyl groups; cycloalkyl groups having from 5 to 7 carbon atoms, e.g., a cyclohexyl group; and alkyl groups substituted with a cycloalkyl group or an aromatic group (e.g., phenyl), e.g., hexahydrobenzyl and benzyl groups.

The gallium trialkoxide used in the process of the present invention can be easily prepared in a conventional manner and is commercially available from Trichemical Laboratory in Japan.

The alcohol solvent which can be used in the reaction include both high-boiling alcohols having a boiling point of not lower than 150° C. and preferably not higher than 300° C. and low-boiling alcohols having a boiling point of lower than 150° C., such as methanol, ethanol, 2-propanol, butanol, and pentanol. Since the low-boiling alcohols achieves a relatively low reaction rate under atmospheric pressure, the high-boiling alcohols are preferred for reduction of a reaction time.

Examples of suitable high-boiling alcohols include aliphatic monohydric alcohols, e.g., n-hexanol, octanol, and decanol; aliphatic polyhydric alcohols, e.g., ethylene glycol, propylene glycol, trimethylene glycol, butylene glycol, tetramethylene glycol, and glycerol; alicyclic alcohols, e.g., cyclohexanol and hexahydrobenzyl alcohol; aromatic alcohols, e.g., benzyl alcohol and phenethyl alcohol; and alcohols substituted with an ether group, an ester group, a nitro group, etc., e.g., propyl cellosolve, ethylene glycol monoacetate, and β-nitroethanol.

Phthalonitrile or diiminoisoindoline is used in an amount of 4 molar equivalents or in slight excess to 1 mol of a gallium trialkoxide. The amount of the alcohol solvent to be used is not particularly limited as long as the reaction system keeps fluidity, and usually ranges from 5 to 20 times, preferably from 7 to 15 times, the weight of a gallium trialkoxide.

The reaction can be carried out by heating the reactants in the alcohol solvent at a temperature ranging from 60° to 300° C., preferably from 150° to 250° C., for a period of from 1 to 24 hours, preferably from 2 to 10 hours. As containing small amounts of side reaction products, the gallium phthalocyanine produced and separated from the reaction mixture is desirably washed with an organic solvent to remove such impurities. Examples of the organic solvent include acetone, methanol, ethanol, N,N-dimethylformamide, dimethyl sulfoxide, N-methylpyrrolidone, and quinoline.

Hydrolysis of the thus synthesized gallium phthalocyanine may be carried out by using either an acid or a base generally in amount of from 2 to 70 parts by volume, preferably from 10 to 50 parts by volume, per part by volume of gallium phthalocyamine. Gallium phthalocyanine has low solubility in a basic solution and tends to form a heterogeneous solution and, therefore, it is suitable to use an acid. Suitable acids include sulfuric acid, hydrochloric acid, hydrobromic acid, nitric acid, phosphoric acid, methanesulfonic acid, trichloroacetic acid, and trifluoroacetic acid. Among them particularly preferred is concentrated sulfuric acid because of its high dissolving power for gallium phthalocyanine, no fuming properties, and easy handling.

The hydrolysis reaction is carried out by adding a solution of gallium phthalocyanine in an acid aqueous solution to large excess of water (so-called "acid-pasting") while stirring at a temperature kept at room temperature or lower, for example, −10° to 10° C. Meantime, hydroxygallium phthalocyanine precipitates in the reaction mixture. The resulting hydroxygallium phthalocyanine is washed with a dilute basic aqueous solution and, if desired, further subjected to common procedures for thorough purification, for example, washing with a distilled water with or without heating until the washing water becomes neutral.

The thus obtained hydroxygallium phthalocyanine exhibits stable electrophotographic characteristics.

The hydroxygallium phthlocyanine crystals of the present invention may further be treated with a solvent directly, or they may be amorphatized by acid-pasting or mechanically milled in a ball mill, mortar, sand mill, kneader or attritor, and then treated with a solvent, whereby the hydroxygallium phthalocyanine crystals can be converted to a desired crystal form. If desired, a grinding aid such as sodium chloride or Glauber's salt may be used during grinding. The proportion of the grinding aid to the hydroxygallium phthalocyanine crystals to be ground is generally from 0.5/1 to 20/1, and preferably from 1/1 to 10/1. By using the grinding aid, the starting crystals can be transferred into crystals with a uniform crystal form extremely efficiently.

Crystal forms of hydroxygallium phthalocyanine crystals of the present invention vary depending on the kind of the above-mentioned treating conditions. Examples of the solvents used in the above solvent treatment include the following compounds:

(i) Examples of the solvents used for preparing hydroxygallium phthalocyanine crystals having distinct diffraction peaks at 7.5°, 9.9°, 12.5°, 16.3°, 18.6°, 25.1° and 28.3° of the Bragg angle (2θ±0.2) in the X-ray diffraction spectrum pattern include amides (e.g., N,N-dimethylformamide, N,N-dimethylacetamide, N-methylpyrrolidone), esters (e.g., ethyl acetate, n-butyl acetate, iso-amyl acetate), and ketones (e.g., acetone, methyl ethyl ketone, methyl iso-butyl ketone).

(ii) Examples of the solvents used for preparing hydroxygallium phthalocyanine crystals having distinct diffraction peaks at 7.7°, 16.5°, 25.1° and 26.6° of the Bragg angle (2θ±0.2) in the X-ray diffraction spectrum pattern include alcohols (e.g., methanol, ethanol), and aromatic compounds (e.g., toluene, chlorobenzene).

(iii) Examples of the solvents used for preparing hydroxygallium phthalocyanine crystals having distinct diffraction peaks at 7.9°, 16.5°, 24.4° and 27.6° of the Bragg angle (2θ±0.2) in the X-ray diffraction spectrum pattern include organic amines (e.g., pyridine, piperidine), and sulfoxides (e.g., dimethylsulfoxide).

(iv) Examples of the solvents used for preparing hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle (2θ±0.2) in the X-ray diffraction spectrum pattern include aromatic alcohols (e.g., benzyl alcohol).

(v) Examples of the solvents used for preparing hydroxygallium phthalocyanine crystals having distinct diffraction peaks at 6.8°, 12.8°, 15.8° and 26.0° of the Bragg angle (2θ±0.2) in the X-ray diffraction spectrum pattern include polyhydric, alcohols (e.g., ethylene glycol, glycerin, polyethylene glycol).

(vi) Examples of the solvents used for preparing hydroxygallium phthalocyanine crystals having distinct diffraction peaks at 7.4°, 9.9°, 25.0°, 26.0°, and 28.2° of the Bragg angle (2θ±0.2) in the X-ray diffraction spectrum pattern include amides (e.g., N,N-dimethylformamide, N,N-dimethylacetamide, N-methylpyrrolidone), esters (e.g., ethyl acetate, n-butyl acetate, iso-amyl acetate), and ketones (e.g., acetone, methyl ethyl ketone, methyl iso-butyl ketone).

In the present invention, the X-ray diffraction pattern is the measurement results of intensities of the Bragg angle (2θ±0.2°) with respect to $CuK_\alpha$ characteristic X-ray (wavelength: 1.541 Å). The measurement conditions are as follows:

Apparatus: X-ray diffractometer (RAD-RC produced by Rigaku K.K.)
Target: Cu (1.54050 Å)
Voltage: 40.0 KV
Start angle: 5.00 deg
Stop angle: 40.00 deg
Step angle: 0.020 deg The solvent to be used in preparing the above-mentioned hydroxygallium phthalocyanine crystals may be in the form of a mixed solvent comprising two or more different solvents or an aqueous mixed solvent comprising one or more different solvents and water.

In accordance with the present invention, a hydroxygallium phthalocyanine is brought into contact with the prescribed solvent to prepare the above-mentioned hydroxygallium phthalocyanine crystals having distinct diffraction peaks at the particular Bragg angles in an X-ray diffraction spectrum pattern. Such solvent treatment includes, for example, not only ordinary recrystallization treatment, but also treatment of a hydroxygallium phthalocyanine, which has been treated with an ordinary organic solvent for a purification during or after synthesis thereof, by washing or wet-grinding with the prescribed solvent. Specifically, in order to prepare hydroxygallium phthalocyanine crystals having the determined crystal form, hydroxygallium phthalocyanine is subjected to solvent treatment by at least one of these treating methods. If any other organic solvents than those defined in the above-mentioned (i) to (vi) are used for washing or wet-grinding treatment of hydroxygallium phthalocyanine, crystal transfer into the desired hydroxygallium phthalocyanine crystals each with the determined crystal form of anyone of (i) to (vi) may sometimes be impossible.

Regarding the solvent treatment conditions, the amount of the solvent used is generally from 1 to 200 parts, and preferably from 10 to 100 parts, per one part of hydroxygallium phthalocyanine to be treated therewith; and the treating temperature is generally from 0° to 150° C., and preferably from room temperature to 100° C. The solvent treatment may be effected in an appropriate vessels under static condition or with stirring. Wet grinding in a ball mill, a mortar, a sand mill, a kneader or an attritor may be effected with the determined solvent. In grinding, inorganic compounds such as sodium chloride or Glauber's salt as well as grinding media such as glass beads, steel beads or alumina beads can be used.

By the above-mentioned solvent treatment, the crystals of hydroxygallium phthalocyanine of the present invention advantageously having better crystallinity and having a more uniform grain size distribution can be obtained.

Surprisingly, the hydroxygallium phthalocyanine prepared by the process of the present invention exhibits superior electrophotographic characteristics to those prepared by the known process when used as a charge generating material in an electrophotographic photoreceptor while their crystal forms are the same. Further, the above-mentioned solvent treatment of the hydroxygallium phthalocyanine of the present invention gives another crystal form which is particularly excellent in photosensitivity and durability as a charge generating material.

In the photoreceptor of the present invention, the light-sensitive layer may be a single layer or may have a laminated structure composed of a charge generating layer and a charge transporting layer each having a different function. In the latter case, the charge generating layer is composed of the above-mentioned hydroxygallium phthalocyanine crystals and a binder resin.

FIG. 5 to FIG. 8 are schematic sectional views showing embodiments of the electrophotographic photoreceptor of the present invention. In the embodiment shown in FIG. 5, a light-sensitive layer composed of charge generating layer 1 and charge transporting layer 2 as laminated thereover, is coated over electroconductive support 3. In the embodiment shown in FIG. 6, subbing layer 4 is provided between charge generating layer 1 and electroconductive support 3. In the embodiment shown in FIG. 7, protective layer 5 is coated over the light-sensitive layer. In the embodiment shown in FIG. 8, the photoreceptor has both subbing layer 4 and protective layer 5.

These layers 1 to 5 will be explained in detail hereunder, along with a light-sensitive layer of laminated structure.

Charge generating layer 1 of the electrophotographic photoreceptor of the present invention can be formed by preparing a coating composition of a dispersion of the above-mentioned hydroxygallium phthalocyanine crystals dispersed in a solution of a binder resin dissolved in an organic solvent, followed by coating the composition onto electroconductive support 3.

The binder resin used in charge generating layer 1 may be selected from various resins of a broad range. Examples thereof include insulating resins, such as polyvinyl acetal resins (e.g., polyvinyl butyral resins, polyvinyl formal resins, and partially acetallized polyvinyl butyral resins in which a part of the butyral moiety has been modified with formal or acetacetal), polyarylate resins (e.g., polycondensate of bisphenol A and phthalic acid), polycarbonate resins, polyester resins, modified ether type polyester resins, phenoxy resins, polyvinyl chloride resins, polyvinylidene chloride resins, polyvinyl acetate resins, polystyrene resins, acrylic resins, methacrylic resins, polyacrylamide resins, polyamide resins, polyvinyl pyrimidine resins, cellulosic resins, polyurethane resins, epoxy resins, silicone resins, polyvinyl alcohol resins, polyvinyl pyrrolidone resins, casein, vinyl chloride-vinyl acetate type copolymers (e.g., vinyl chloride-vinyl acetate copolymer, hydroxyl-modified vinyl chloride-vinyl acetate copolymer, carboxy-modified vinyl chloride-vinyl acetate copolymer, vinyl chloride-vinyl acetate-maleic anhydride copolymer), styrene-butadiene copolymers, vinylidene chloride-acrylonitrile copolymers, styrene-alkyd resins, silicone-alkyd resins, and phenol-formaldehyde resins. In addition, organic photoconductive polymers such as poly-N-vinyl carbazole, polyvinyl anthracene and polyvinyl pyrene can also be used. However, these insulating resins and organic photoconductive polymers are not limitative. These binder resins can be used singly or in combination of two or more of them.

As the solvent of dissolving the binder resin, preferred is an organic solvent which does not dissolve subbing layer 4. Specific examples of the organic solvents include alcohols such as methanol, ethanol, n-propanol, i-propanol, n-butanol and benzyl alcohol; ketones such as acetone, methyl ethyl ketone and cyclohexanone; amides such as dimethylformamide and dimethylacetamide; sulfoxides such as dimethylsulfoxide; cyclic or linear ethers such as tetrahydrofuran, dioxane, diethyl ether, methyl cellosolve and ethyl cellosolve; ester such as methyl acetate, ethyl acetate and n-butyl acetate; halogenated aliphatic hydrocarbons such as methylene chloride, chloroform, carbon tetrachloride, dichloroethylene and trichloroethylene; mineral oils such as ligroin; aromatic hydrocarbons such as benzene, toluene and xylene; and halogenated aromatic hydrocarbons such as chlorobenzene and dichlorobenzene. These can be used singly or in combination of two or more of them.

The proportion of the above-mentioned hydroxygallium phthalocyanine crystals to the binder resin generally falls within the range of from $40/1$ to $1/20$, and preferably from $10/1$ to $1/10$, by weight. If the proportion of the hydroxygallium phthalocyanine crystals is too high, the stability of the coating composition tends to lower. If it is too low, the sensitivity of the photoreceptor tends to lower. Therefore, the proportion generally falls within the above range.

For dispersing the hydroxygallium phthalocyanine crystals, any ordinary methods, such as ball mill dispersion method, attritor dispersion method or sand mill dispersion method, can be employed. The crystals are preferred to be dispersed finely to have a grain size of 0.5 µm or less, more preferably 0.3 µm or less, and particularly preferably 0.15 µm or less. In dispersing the crystals, such a condition is needed that the crystal form of the hydroxygallium phthalocyanine crystals to be dispersed does not change. In this connection, the present inventors confirmed that the crystal forms of the hydroxygallium phthalocyanine crystals of the present invention do not change after dispersion by employing any of the above-mentioned dispersion methods.

For coating the coating composition, any conventional method may be employed, such as dip coating method, spray coating method, spinner coating method, bead coating method, wire bar coating method, blade coating method, roller coating method, air knife coating method or curtain coating method. Drying of the coated composition may be effected preferably by drying to touch at room temperature followed by drying with heat under static condition or with blowing at a temperature of from 30° to 200° C. for a period of from 5 minutes to 2 hours. The thickness of charge generating layer 1 is generally from 0.05 to 5 μm, and preferably from 0.2 to 2.0 μm.

In charge generating layer 1, the hydroxygallium phthalocyanine crystals of the present invention having distinct diffraction peaks at 7.5°, 9.9°, 12.5°, 16.3°, 18.6°, 25.1° and 28.3° of the Bragg angle (2θ±0.2°) in the X-ray diffraction spectrum pattern are preferably selected from the viewpoints of the light-sensitivity and durability. Of the above-mentioned binder resins, at least one selected from polyvinyl acetal resins, vinyl chloride-vinyl acetate copolymers, phenoxy resins and modified ether type polyester resins are preferred from the viewpoints of the dispersibility of hydroxygallium phthalocyanine crystals therein, the coatability of the resulting dispersion as a coating composition and the sensitivity characteristics, charge retentiveness and image characteristics of the photoreceptor formed with the coating composition. The combination of hydroxygallium phthalocyanine crystals of the present invention having distinct diffraction peaks at 7.5°, 9.9°, 12.5°, 16.3°, 18.6°, 25.1° and 28.3° of the Bragg angle (2θ±0.2°) in the X-ray diffraction spectrum pattern and these binder resins are favorable since the photographic characteristics of the electrophotographic photoreceptor to be manufactured are especially excellent.

Charge transporting layer 2 of the electrophotographic photoreceptor of the present invention may be formed by incorporating a charge transporting material into a binder.

As the charge transporting material, any known charge transporting materials can be used, for example, oxadiazole derivatives such as 2,5-bis-(p-diethylaminophenyl)-1,3,4-oxadiazole; pyrazoline derivatives such as 1,3,5-triphenylpyrazoline and 1-[pyridyl-(2)]-3-(p-diethylaminostyryl)-5-(p-diethylaminophenyl)pyrazoline; aromatic tertiary monoamino compounds such as triphenylamine and dibenzylaniline; aromatic tertiary diamino compounds such as N,N'-diphenyl-N,N'-bis(m-tolyl)benzidine; 1,2,4-triazine derivatives such as 3-(p-diethylaminophenyl)-5,6-di-(p-methoxyphenyl)-1,2,4-triazine; hydrazone derivatives such as 4-diethylaminobenzaldehyde-2,2-diphenylhydrazone; quinazoline derivatives such as 2-phenyl-4-styrylquinazoline; benzofuran derivatives such as 6-hydroxy-2,3-di-(p-methoxyphenyl)benzofuran; α-stilbene derivatives such as p-(2,2-diphenylvinyl)-N,N-diphenylaniline; triphenylmethane derivatives; enamine derivatives as described in *Journal of Imaging Science*, vol. 29, pp. 7–10 (1985); carbazole, N-ethylcarbazole, poly-N-vinyl carbazole, halogenated poly-N-vinyl carbazoles, polyglycidyl carbazole, poly-γ-carbazole ethyl glutamate and their derivatives; polycyclic aromatic compounds such as anthracene, pyrene and phenanthrene; nitrogen-containing heterocyclic compounds such as indole and imidazole; and polyvinyl anthracene, poly-9-vinylphenyl anthracene, polyvinyl pyrene, polyvinyl acridine, polyvinyl acenaphthene, pyrene-formaldehyde resins, and ethylcarbazole-formaldehyde resins. However, these are not limitative. These charge transporting materials can be used either singly or in combination of two or more of them. Where a photoconductive polymer is used as the charge transporting material, it may form a layer by itself.

As the binder resin of forming charge transporting layer 2, those mentioned above for charge generating layer 1 can be used, for example, polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, and poly-N-vinylcarbazole resins.

Charge transporting layer 2 can be formed by preparing a coating composition from the above-mentioned charge transporting material and the binder resin and an organic solvent such as those mentioned above for charge generating layer 1, followed by coating the resulting coating composition onto charge generating layer 1 by the same means as the above-mentioned coating means. The proportion of the charge transporting material to the binder resin is preferably from 10/1 to 1/5 by weight. The thickness of charge transporting layer 2 is generally approximately from 5 to 50 μm, and preferably from 10 to 30 μm.

Where the light-sensitive layer of the photoreceptor of the present invention has a single layer constitution, the light-sensitive layer is a photoconductive layer comprising the above-mentioned hydroxygallium phthalocyanine crystals as dispersed in a charge transporting material and a binder resin. As the charge transporting material and binder resin, those to be used in preparing a laminate-structure light-sensitive layer can be used. The single-layer photoconductive layer may be formed in the same manner as mentioned above. Use of hydroxygallium phthalocyanine crystals having distinct diffraction peaks at 7.5°, 9.9°, 12.5°, 16.3°, 18.6°, 25.1° and 28.3° of the Bragg angle (2θ±0.2°) in the X-ray diffraction spectrum pattern and at least one binder resin selected from polyvinyl acetal resins, vinyl chloridevinyl acetate copolymers phenoxy resins and modified ether type polyester resins is the most preferred because of the same reasons as mentioned above.

Where the light-sensitive layer is has a single layer constitution, the proportion of the charge transporting material to the binder resin is preferably be approximately from 1/20 to 5/1 by weight; and the proportion of the hydroxygallium phthalocyanine crystals to the charge transporting material is preferably approximately from 1/10 to 10/1 by weight.

As the electroconductive support 3, any conventional materials for preparing electrophotographic photoreceptors can be employed.

Specific examples thereof include metals such as aluminium, nickel, chromium and stainless steel; plastic films as coated with aluminium, titanium, nickel, chromium, stainless steel, gold, vanadium, tin oxide, indium oxide or ITO; as well as plastic films or paper coated with or dipped in an electroconductivity imparting agent. Electroconductive support 3 can be used in any shape such as a drum, sheet or plate support, which, however, is not limitative. If desired, the surface of electroconductive support 3 may be subjected to various treatment as long as the treatment would not have any adverse influence on the resulting image quality. For instance, the surface may be oxidized, treated with chemicals, colored or matted for making the surface diffusively reflectable.

In the present invention, subbing layer 4 may be provided between electroconductive support 3 and the light-sensitive layer. Subbing layer 4 is effective for inhibiting injection of any unnecessary charges from electroconductive support 3 to the light-sensitive layer while the layer is charged, and it has a function of improving the charging property of the light-sensitive layer. In addition, it also has another function of elevating the adhesiveness between the light-sensitive layer and electroconductive support 3. Furthermore, it may also have a function of preventing light reflected from electroconductive support 3.

Examples of materials of forming subbing layer 4 include polyethylene resins, polypropylene resins, acrylic resins, methacrylic resins, vinyl chloride resins, vinylidene chloride resins, vinyl acetate resins, phenolic resins, polycarbonate resins, polyurethane resins, polyamide resins, polyimide resins, polyvinyl acetal resins, vinyl chloride-vinyl acetate copolymers, polyvinyl alcohol resins, polyacrylic acid resins, polyacrylamide resins, polyvinyl pyrrolidone resins, polyvinyl pyridine resins, water-soluble polyester resins, cellulose ester resins such as nitrocellulose, cellulose ether resins, caseins, gelatins, polyglutamic acids, starches, starch acetates, amino starches, organic zirconium compounds such as zirconium chelate compounds and zirconium alkoxide compounds, organic titanyl compounds such as titanyl chelate compounds and titanyl alkoxide compounds, and silane coupling agents.

As the coating method for forming subbing layer 4, any conventional method can be used. Examples thereof include blade coating method, wire bar coating method, spray coating method, dip coating method, bead coating method, air knife coating method, and curtain coating method. The thickness of the subbing layer 4 is generally from 0.01 to 10 μm, and preferably from 0.05 to 2 μm.

In the present invention, the surface of the light-sensitive layer may be coated with protective layer 5 if desired. Protective layer 5 is formed for the purpose of preventing chemical deterioration of charge transporting layer 2 during charging of the laminate-structure light-sensitive layer and of improving the mechanical strength of the light-sensitive layer.

Protective layer 5 can be formed by incorporating an electroconductive material in a binder resin. Examples of the electroconductive material include metallocene compounds such as dimethylferrocene; aromatic amino compounds such as N,N'-diphenyl-N,N'-bis-(m-tolyl)benzidine; and metal oxides such as antimony oxide, tin oxide, titanium oxide, indium oxide, and tin oxide-antimony oxide. However, these are not limitative. As the binder resin, any conventional binder resin can be used. Examples thereof include polyamide resins, polyurethane resins, polyester resins, epoxy resins, polyketone resins, polycarbonate resins, polyvinyl ketone resins, polystyrene resins, and polyacrylamide resins.

Protective layer 5 is preferably to have an electric resistance of from $10^9$ to $10^{14}$ Ω.cm. If the electric resistance of the layer is more than $10^{14}$ Ω.cm, the residual potential tends to rise to give images with much fog. If it is less than $10^9$ Ω.cm, the images to be formed tends to be blurred and the resolving power would lower. The protective layer must be formed in such a way that it does not substantially interfere with penetration of the light therethrough as irradiated thereto for imagewise exposure.

Pot forming protective layer 5, any conventional coating methods may be employed. Examples thereof include blade coating method, wire bar coating method, spray coating method, dip coating method, bead coating method, air knife coating method, and curtain coating method. The thickness of protective layer 5 is generally from 0.5 to 20 μm, and preferably from 1 to 10 μm.

The present invention will be explained in more detail by way of the following examples, which, however, are not intended to restrict the scope of the present invention. Unless otherwise specifically defined, all "parts" therein are by weight.

EXAMPLE 1

Figure 2:
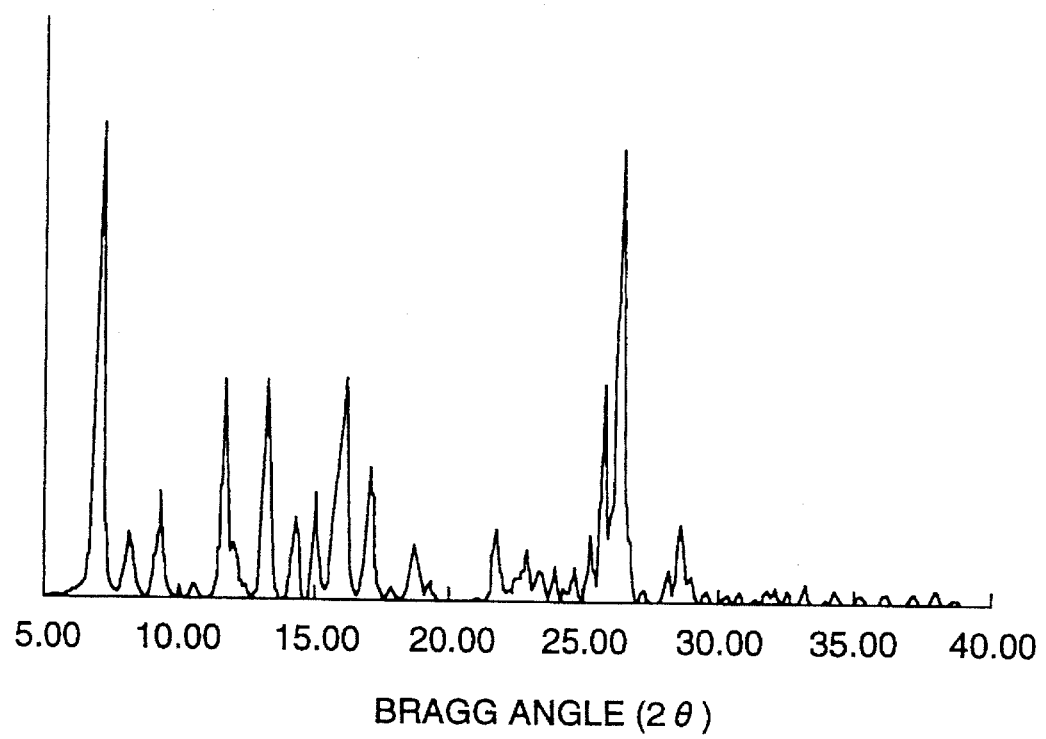
FIG. 2 is a powder X-ray diffraction pattern of the hydroxygallium phthalocyanine crystals obtained in Example 1.

In a 300 ml flask were charged 9.0 g of gallium tri-n-butoxide, 16.0 g of phthalonitrile, and 100 ml of ethylene glycol, and the mixture was allowed to react at reflux in a nitrogen stream for 6 hours. After cooling to 100° C., the produced gallium phthalocyanine was collected by filtration and washed twice with 100 ml of dimethylformamide. The product was suspended in 100 ml of methanol, heated at reflux for 1 hour, followed by filtration. The methanol washing was repeated once more. Drying under reduced pressure yielded 11.9 g of gallium phthalocyanine. The IR spectrum and powder X-ray diffraction pattern of the resulting gallium phthalocyanine are shown in FIGS. 1 and 2, respectively.

A 2.0 g portion of the resulting gallium phthalocyanine was dissolved in 60.0 g of ice-cooled concentrated sulfuric acid, and the solution was slowly added dropwise to 400 ml of distilled water while maintaining the reaction mixture at 5° C. to precipitate hydroxygallium phthalocyanine, which was collected by centrifugal separation. The wet cake was dispersed in 300 ml of distilled water, followed by centrifugation. The washing with water was repeated once more. The wet cake was further dispersed in 50 ml of 2% aqueous ammonia, followed by centrifugation, then dispersed in 300 ml of distilled water, followed by centrifugation. The washed solid was dried to give 1.45 g of a hydroxygallium phthalocyanine crystal.

COMPARATIVE EXAMPLE 1

To 230 g of quinoline were added 30 g of 1,3-diiminoisoindoline and 9.1 g of gallium trichloride, and the mixture was allowed to react at 200° C. for 3 hours. The reaction product was collected by filtration was washed successively with acetone and methanol and dried to obtain 28 g of a chlorogallium phthalocyanine crystal.

A 2.0 g portion of the resulting chlorogallium phthalocyanine was dissolved in 60.0 g of ice-cooled concentrated sulfuric acid, and the solution was slowly added dropwise to 400 ml of distilled water while maintaining the reaction mixture at 5° C. to precipitate hydroxygallium phthalocyanine, which was collected by centrifugal separation. The wet cake was dispersed in 300 ml of distilled water, followed by centrifugation. The washing with water was repeated once more. The wet cake was further dispersed in 50 ml of 2% aqueous ammonia, followed by centrifugation, then dispersed in 300 ml of distilled water, followed by centrifugation. The washed solid was dried to give 1.66 g of hydroxygallium phthalocyanine. The IR spectrum and powder X-ray diffraction pattern of the resulting crystal were the same as those of Example 1.

COMPARATIVE EXAMPLE 2

In a 100 ml flask were put 0.5 g of gallium tri-n-butoxide, 0.9 g of phthalonitrile and 10 ml of quinoline. The mixture was allowed to react at 200° C. for 3 hours in a nitrogen stream but failed to produce gallium phthalocyanine, only forming a brown powder.

COMPARATIVE EXAMPLE 3

In a 100 ml flask were put 0.5 g of gallium tri-n-butoxide, 0.9 g of phthalonitrile and 10 ml of α-chloronaphthalene. The mixture was allowed to react at 200° C. for 3 hours in a nitrogen stream but failed to produce gallium phthalocyanine, only forming a brown powder.

REFERENCE EXAMPLE 1

Figure 3:
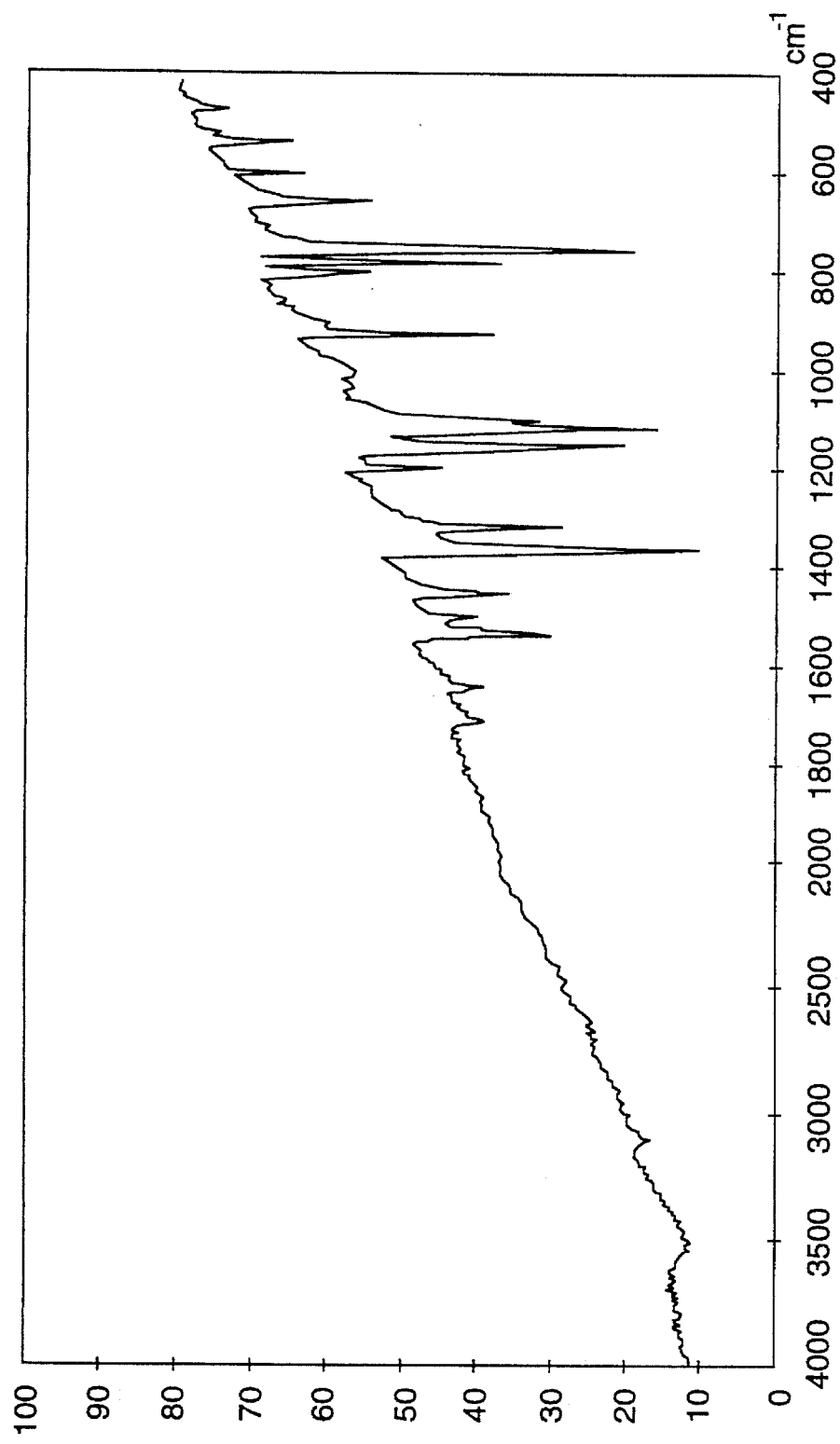
FIG. 3 is an IR spectrum of the hydroxygallium phthalocyanine crystal obtained in Reference Examples 1.
Figure 4:
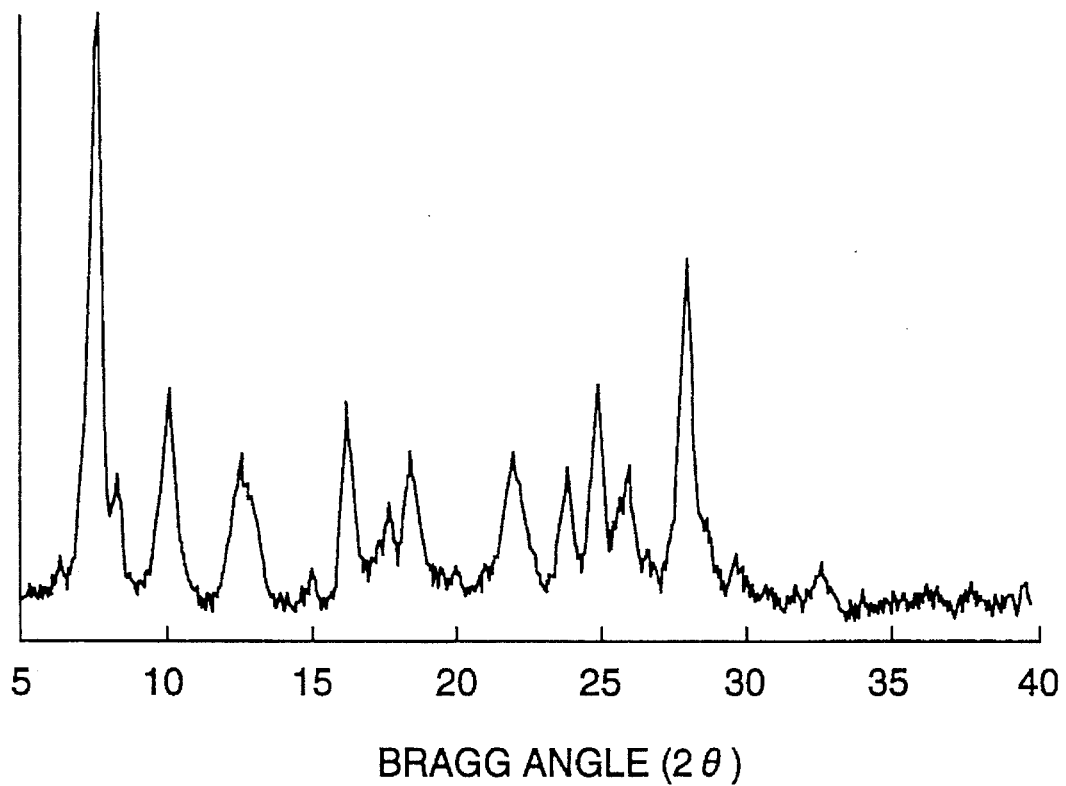
FIG. 4 is a powder X-ray diffraction pattern of the hydroxygallium phthalocyanine crystals obtained in Reference Example 1.
Figure 5:
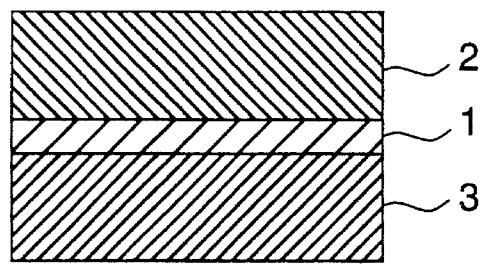
FIG. 5 is a schematic sectional view of showing an embodiment of the electrophotographic photoreceptor of the present invention.
Figure 6:
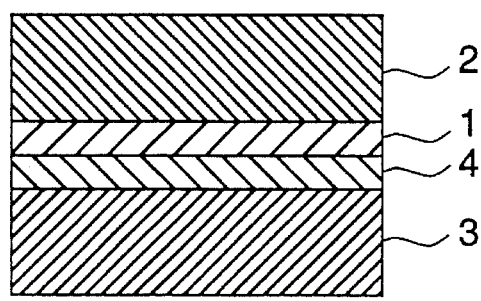
FIG. 6 is a schematic sectional view of showing another embodiment of the electrophotographic photoreceptor of the present invention.
Figure 7:
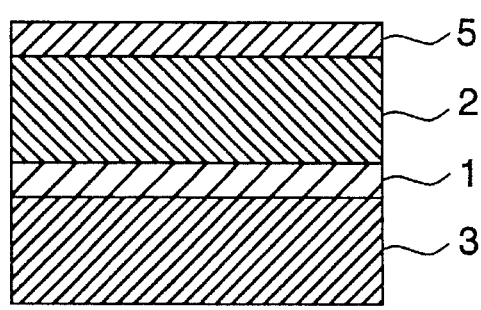
FIG. 7 is a schematic sectional view of showing still another embodiment of the electrophotographic photoreceptor of the present invention.
Figure 8:
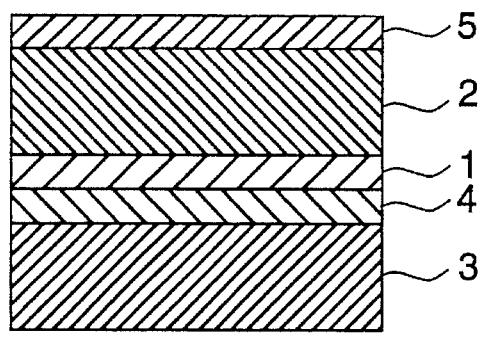
FIG. 8 is a schematic sectional view of showing still another embodiment of the electrophotographic photoreceptor of the present invention.

The hydroxygallium phthalocyanine crystal (0.5 part) obtained in Example 1 was milled together with 15 parts of N,N-dimethylformamide and 30 parts of glass beads of 1 mm in diameter for 24 hours. The crystals were separated, washed with methanol, and dried to obtain a hydroxygallium phthalocyanine crystal. The IR spectrum and powder X-ray diffraction pattern of the resulting crystal are shown in FIGS. 3 and 4, respectively.

REFERENCE EXAMPLE 2

The hydroxygallium phthalocyanine crystal (0.5 part) obtained in Comparative Example 1 was subjected to a solvent treatment in the same manner as in Reference Example 1 to obtain a hydroxygallium phthalocyanine crystal. The IR spectrum and powder X-ray diffraction pattern of the resulting crystal were the same as those of Reference Example 1.

APPLICATION EXAMPLE 1

A solution consisting of 10 parts of a zirconium compound ("Orgatics ZC540" produced by Matsumoto Seiyaku K.K.), 1 part of a silane compound ("A 1110" produced by Nippon Unicar Co., Ltd.), 40 parts of 2-propanol, and 20 parts of butanol was coated on an aluminum substrate by dip coating and dried by heating at 150° C. for 10 minutes to form a subbing layer having a thickness of 0.5 µm.

The hydroxygallium phthalocyanine crystal obtained in Reference Example 1 (0.1 part) was mixed with 0.1 part of a polyvinyl butyral resin ("S-Lec BM-S" produced by Sekisui Chemical Co., Ltd.) and 10 parts of n-butyl acetate, and the mixture was dispersed in a paint shaker together with glass beads for 1 hour. The resulting coating composition was coated on the subbing layer with a wire bar No. 5 and dried by heating at 100° C. for 10 minutes to form a charge generating layer having a thickness of about 0.15 µm. X-Ray diffractometry of the hydroxygallium phthalocyanine crystal in the coating composition revealed that the crystal form had not changed on being dispersed.

In 20 parts of monochlorobenzene were dissolved 2 parts of a benzidine compound represented by formula (I):

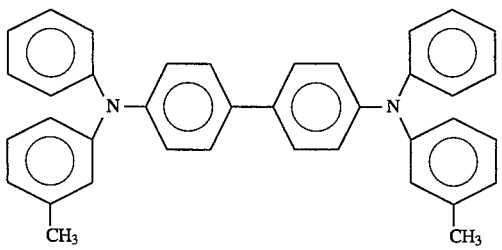

and 3 parts of a polycarbonate resin having a repeating unit of formula (II) and having a viscosity-average molecular weight of 39,000:

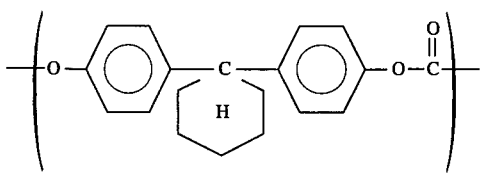

and the resulting coating composition was coated on the charge generating layer by dip coating and dried by heating at 120° C. for 1 hour to form a charge transporting layer having a thickness of 20 µm.

Electrophotographic characteristics of the thus prepared electrophotographic photoreceptor were evaluated by using a flat plate scanner manufactured by the applicant of the present invention as follows. The photoreceptor was charged to a potential of $V_0$ V by a corona discharge of $-2.5$ µA under a normal temperature and normal humidity condition (20° C., 40% RH). After 1 second, the dark potential $V_{DDP}$ (V) was measured to obtain a dark decay rate DDR (DDR=$V_0$–$V_{DDP}/V_0 \times 100(\%)$). Then, the photoreceptor was exposed to monochromatic light of 780 nm which was isolated from light emitted from a tungsten lamp by means of a monochromator and adjusted to 0.25 µmW/cm² on the surface of the photoreceptor. The initial sensitivity (dV/dE (V.cm²/erg)) was measured. The results of these measurements are shown in Table 1 below.

APPLICATION EXAMPLE 2

An electrophotographic photoreceptor was prepared in the same manner as in Application Example 1, except for using the hydroxygallium phthalocyanine crystal obtained in Reference Example 2, and the electrophotographic characteristics of the photoreceptor were evaluated in the same manner. The results obtained are shown in Table 1.

TABLE 1

| Application Example No. | HOGaPc* | $V_0$ (V) | $V_{DDP}$ (V) | DDR (%) | dV/dE (V · cm²/erg) |
|---|---|---|---|---|---|
| 1 | Ref. Ex. 1 | −596 | −567 | 4.9 | 277 |
| 2 | Ref. Ex. 2 | −576 | −521 | 9.5 | 185 |

Note: *Hydroxygallium phthalocyanine

As demonstrated in Table 1, the present invention provides hydroxygallium phthalocyanine having stable electrophotographic characteristics, particularly a small dark decay rate and high photosensitivity.

While the invention has been described in detail and with reference to specific examples thereof, it will be apparent to one skilled in the art that various changes and modifications can be made therein without departing from the spirit and scope thereof.

What is claimed is:

1. A process for preparing hydroxygallium phthalocyanine comprising reacting a gallium trialkoxide and phthalonitrile or diiminoisoindoline in an alcohol solvent and hydrolyzing the resulting gallium phthalocyanine.

2. The process as claimed in claim 1, wherein said alcohol solvent has a boiling point of not lower than 150° C.

3. The process as claimed in claim 1, wherein said hydrolyzing is conducted by using sulfuric acid.

4. The process as claimed in claim 1, wherein the amount of said alcohol solvent is 5 to 20 times the weight of a gallium alkoxide.

5. The process as claimed in claim 2, wherein said alcohol solvent is selected from the group consisting of n-hexanol, octanol, decanol, ethylene glycol, propylene glycol, trimethylene glycol, butylene glycol, tetramethylene glycol, glycerol, cyclohexanol, hexahydrobenzyl alcohol, benzyl alcohol, phenethyl alcohol, propyl cellosolve, ethylene glycol monoacetate, and β-nitroethanol.

6. The process as claimed in claim 1, wherein said reaction is carried out at a temperature of 60° to 300° C. for 1 to 24 hours.

7. The process as claimed in claim 1, wherein the alkyl moiety of said gallium trialkoxide is selected from the group consisting of a straight chain or branched alkyl group having 1 to 20 carbon atoms, a cycloalkyl group having 5 to 7 carbon atoms, and an alkyl group substituted with a cycloalkyl group or a phenyl group.

8. A hydroxygallium phthalocyanine prepared by reacting a gallium trialkoxide and phthalonitrile or diiminoisoindoline in an alcohol solvent and hydrolyzing the resulting gallium phthalocyanine.

9. A process for preparing hydroxygallium phthalocyanine crystals having distinct diffraction peaks comprising reacting a gallium trialkoxide and phthalonitrile or diiminoisoindoline in an alcohol solvent; hydrolyzing a resulting gallium phthalocyanine; and treating a resulting hydroxygallium phthalocyanine with a solvent to produce hydroxygallium phthalocyanine crystals having distinct diffraction peaks at degrees of the Bragg angle ($2\theta \pm 0.2$) in the X-ray diffraction spectrum pattern.

10. The process as claimed in claim 9, wherein said solvent is selected from the group consisting of amides, esters and ketones to produce hydroxygallium phthalocyanine crystals having distinct diffraction peaks at 7.5°, 9.9°, 12.5°, 16.3°, 18.6°, 25.1° and 28.3° of the Bragg angle.

11. The process as claimed in claim 10, wherein said solvent is selected from the group consisting of N,N-dimethylformamide, N,N-dimethylacetamide, N-methylpyrrolidone, ethyl acetate, n-butyl acetate, iso-amyl acetate, acetone, methyl ethyl ketone and methyl iso-butyl ketone.

12. The process as claimed in claim 9, wherein said solvent is selected from the group consisting of alcohols and aromatic compounds to produce hydroxygallium phthalocyanine crystals having distinct diffraction peaks at 7.7°, 16.5°, 25.1° and 26.6° of the Bragg angle.

13. The process as claimed in claim 12, wherein said solvent is selected from the group consisting of methanol, ethanol, toluene and chlorobenzene.

14. The process as claimed in claim 9, wherein said solvent is selected from the group consisting of organic amines and sulfoxides to produce hydroxygallium phthalocyanine crystals having distinct diffraction peaks at 7.9°, 16.5°, 24.4° and 27.6° of the Bragg angle.

15. The process as claimed in claim 14, wherein said solvent is selected from the group consisting of pyridine, piperidine and dimethylsulfoxide.

16. The process as claimed in claim 9, wherein said solvent is an aromatic alcohol to produce hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle.

17. The process as claimed in claim 16, wherein said solvent is benzyl alcohol.

18. The process as claimed in claim 9, wherein said solvent is a polyhydric alcohol to produce hydroxygallium phthalocyanine crystals having distinct diffraction peaks at 6.8°, 12.8°, 15.8° and 26.0° of the Bragg angle.

19. The process as claimed in claim 18, wherein said solvent is selected from the group consisting of ethylene glycol, glycerin and polyethylene glycol.

20. The process as claimed in claim 9, wherein said solvent is selected from the group consisting of amides, esters and ketones to produce hydroxygallium phthalocyanine crystals having distinct diffraction peaks at 7.4°, 9.9°, 25.0°, 26.0° and 28.2° of the Bragg angle.

21. The process as claimed in claim 20, wherein said solvent is selected from the group consisting of N,N-dimethylformamide, N,N-dimethylacetamide, N-methylpyrrolidone, ethyl acetate, n-butyl acetate, iso-amyl acetate, acetone, methyl ethyl ketone and methyl iso-butyl ketone.

22. The process as claimed in claim 9, wherein said gallium phthalocyanine is amorphatized by acid pasting or mechanically milled prior to treating with said solvent.

* * * * *